US008014992B2

(12) United States Patent
Smith

(10) Patent No.: US 8,014,992 B2
(45) Date of Patent: Sep. 6, 2011

(54) ELECTRIC POWER SYSTEM TRAINING SIMULATION SOFTWARE AND PROCESS FOR ELECTRIC POWER SYSTEM TRAINING

(76) Inventor: William H Smith, Marietta, GA (US)

( * ) Notice: Subject to any disclaimer, the term of this patent is extended or adjusted under 35 U.S.C. 154(b) by 910 days.

(21) Appl. No.: 11/756,176

(22) Filed: May 31, 2007

(65) Prior Publication Data

US 2007/0282588 A1 Dec. 6, 2007

Related U.S. Application Data

(60) Provisional application No. 60/803,529, filed on May 31, 2006.

(51) Int. Cl.
G06F 17/50 (2006.01)
(52) U.S. Cl. .......................... 703/18; 434/224; 434/335
(58) Field of Classification Search .............. 703/2, 13, 703/14, 18; 434/224, 327, 335, 336, 362
See application file for complete search history.

(56) References Cited

U.S. PATENT DOCUMENTS

| 3,589,106 | A | * | 6/1971 | Onuki | 96/222 |
| 3,896,041 | A | * | 7/1975 | Alliston et al. | 703/18 |
| 3,903,403 | A | * | 9/1975 | Ferguson et al. | 703/18 |
| 3,911,286 | A | * | 10/1975 | Uram | 290/40 R |
| 3,914,794 | A | * | 10/1975 | Czerniejewski | 703/18 |
| 3,916,444 | A | * | 10/1975 | Alliston et al. | 376/217 |
| 4,042,813 | A | * | 8/1977 | Johnson | 703/18 |
| 4,064,392 | A | * | 12/1977 | Desalu | 703/18 |
| 4,455,614 | A | * | 6/1984 | Martz et al. | 700/288 |
| 4,977,529 | A | * | 12/1990 | Gregg et al. | 703/18 |
| 5,619,433 | A | * | 4/1997 | Wang et al. | 703/18 |
| 6,289,299 | B1 | * | 9/2001 | Daniel et al. | 703/21 |
| 7,110,835 | B2 | * | 9/2006 | Blevins et al. | 700/83 |
| 7,117,135 | B2 | * | 10/2006 | Cull et al. | 703/6 |
| 7,395,252 | B2 | * | 7/2008 | Anderson et al. | 706/45 |
| 2003/0211448 | A1 | * | 11/2003 | Quimper et al. | 434/219 |
| 2003/0211451 | A1 | * | 11/2003 | Bergeron et al. | 434/362 |

OTHER PUBLICATIONS

Waylett, W. Human Factors in Simulator Instructor Facility Design, CFonference Record fot 1988 IEEE 4$^{th}$ Conference on Human Factors and Power Plants, Jun. 1988, pp. 559-564.*
Krost et al., On the Way Towards Closed Loop Power System Operation?, IEEE International Conference on Electric Power Engineering, PowerTech Budapest 99, 1999, 1 page.*
Overbye et al., A User-Friendly Simulation Program for Teaching Power System Operations, IEEE Transactions on power Systems, vol. 10, No. 4, Nov. 1995, pp. 1725-1733.*

(Continued)

Primary Examiner — Russell Frejd
(74) Attorney, Agent, or Firm — Blynn L. Shideler; Krisanne Shideler; BLK Law Group

(57) ABSTRACT

A time driven, computer simulation based electric power system training software package designed to train power system operators is used with an existing set of electric power system modeling algorithms, such as sold under the Powerworld™ brand. The software package includes: a file that provides all the data to be plugged into the electric power system modeling algorithms, a graphics file that shows a picture of the power system and serves as a graphical man-machine interface with the modeling algorithms, a time dimension file that initiates and ends the simulation session and changes specific data in the data file as time progresses and stores a history of selected parameters over the course of the session; and a spreadsheet file, such as an Excel® spreadsheet, that performs calculations on data and presents data in graphical form based on output from the modeling algorithms at the end of the simulation.

13 Claims, 6 Drawing Sheets

OTHER PUBLICATIONS

Veh et al, Design and Operation of a Virtual Reality Operator-Training System, IEEE Transactions on Power Systems, vol. 11, No. 3, Aug. 1996, pp. 1585-1591.*

Tam et al, A Low-Cost PC-Oriented Virtuial Environment for Operator Training, IEEE, International Conference on Power Industry Computer Applications, 1997, pp. 829-835.*

Tam et al, A Web-Based Virtual Environment for Operator Training, IEEE Transactions on Power Systems, vol. 14, No. 3, Aug. 1999, pp. 802-808.*

Arroyo et al, SRV: A Virtual Reality Application to Electrical Substations Operation Training, 1999, pp. 835-839.*

* cited by examiner

ELECTRIC POWER SYSTEM TRAINING SIMULATION SOFTWARE AND PROCESS FOR ELECTRIC POWER SYSTEM TRAINING

RELATED APPLICATIONS

This application claims the benefit of U.S. Provisional patent application Ser. No. 60/803,529 entitled "Electric Power System Training Simulation Software" filed May 31, 2006.

BACKGROUND OF THE INVENTION

1. Field of the Invention

The present invention relates generally to computer simulations for training. More particularly, the present invention relates to a time driven, computer simulation based electric power system training software package designed to train power system operators and the associated process.

2. Background Information

The electric power industry currently uses computer mathematical models to analyze power systems. Companies such as EPRI, PTI, General Electric, Siemens and Areva have developed power system modeling software packages for a variety of applications including power system control and system planning. None of these existing packages was developed primarily to train power system operators, and are limited with regard to such a purpose. When power system computer models are used to perform analyses of power systems, they are typically used to investigate what-if scenarios and determine the cost of various alternatives related to the building or upgrading of facilities. Usually the time domain is of no interest in applications of this type. The analyses are performed on specific snapshots of system conditions. Conditions change from snapshot to snapshot but time is not associated with these snapshots.

When power system computer tools were first used for training purposes, power system operators used planning and system operation computer programs which were designed for those purposes and not for operator training. Power system operators were presented with a static state of the power system and, under supervision of an instructor, were asked to take action to fix a recognized problem. As computing power increased, computer model developers were able to have certain aspects of a static state change due to a spontaneous external command from the instructor thus causing operators to need to respond to changing conditions. The student operator undergoing training would respond to changing conditions by varying generator outputs, capacitor settings and line configurations to keep voltages within range and keep lines from overloading. The student operator would balance these critical parameters for the duration of the simulation and the student operator and the instructor would observe in "real time" whether his actions were sufficient to meet operating standards. If the operator took any seriously wrong actions or failed to act the system might "black out" causing a need to start over. For the most part, the system provided no history or record of events of operator action.

There remains a need for an effective computer time driven, computer simulation based electric power system training software package designed to train power system operators.

SUMMARY OF THE INVENTION

The various embodiments and examples of the present invention as presented herein are understood to be illustrative of the present invention and not restrictive thereof and are non-limiting with respect to the scope of the invention.

According to one embodiment of the present invention addressing the above stated objects, the present invention provides a time driven, computer simulation based electric power system training software package designed to train power system operators. The software package of the present invention is used with an existing set of electric power system modeling algorithms, such as sold under the Powerworld™ brand. The software package of the present invention consists of four computer files: 1) a binary file that provides all the data to be plugged into the electric power system modeling algorithms, 2) a graphics file that shows a picture of the power system and serves as a graphical man-machine interface with the electric power system modeling algorithms, 3) a time dimension file that initiates and ends the simulation session and that changes specific data in the data file as time progresses and stores a history of selected parameters over the course of the simulation session; and 4) a spreadsheet file, such as an Excel® spreadsheet program, that performs calculations on data and presents data in graphical form based on output from the electric power system modeling algorithms at the end of the simulation time.

One aspect of the present invention provides a Process for Electric Power System Training using an existing set of electric power system modeling algorithms comprising: Providing the electric power system operational data to be plugged into the electric power system modeling algorithms; Providing a graphical man-machine interface with the electric power system modeling algorithms; Initiating and ending the simulation session over a given time set for the session; changing specific data in the data file as time progresses within the session; storing a history of selected parameters over the course of the simulation session; wherein the selected parameters include at least generation production costs, line loadings, system load and voltage profiles.

Further the Process for Electric Power System Training according to the invention may provide that the trainee objective is for the operator to minimize simulated total system costs for each session. The Process for Electric Power System Training according to the invention may further include the step of providing a numerical feedback to the trainee for each session. The Process for Electric Power System Training may provide that costs are assigned to all other key parameters that are measured in the simulation. The Process for Electric Power System Training may further include the step of presenting session data in graphical form based on output from the electric power system modeling algorithms at the end of the simulation time.

These and other advantages of the present invention will be clarified in the description of the preferred embodiments taken together with the attached figures.

DESCRIPTION OF THE PREFERRED EMBODIMENTS

Figure 1:
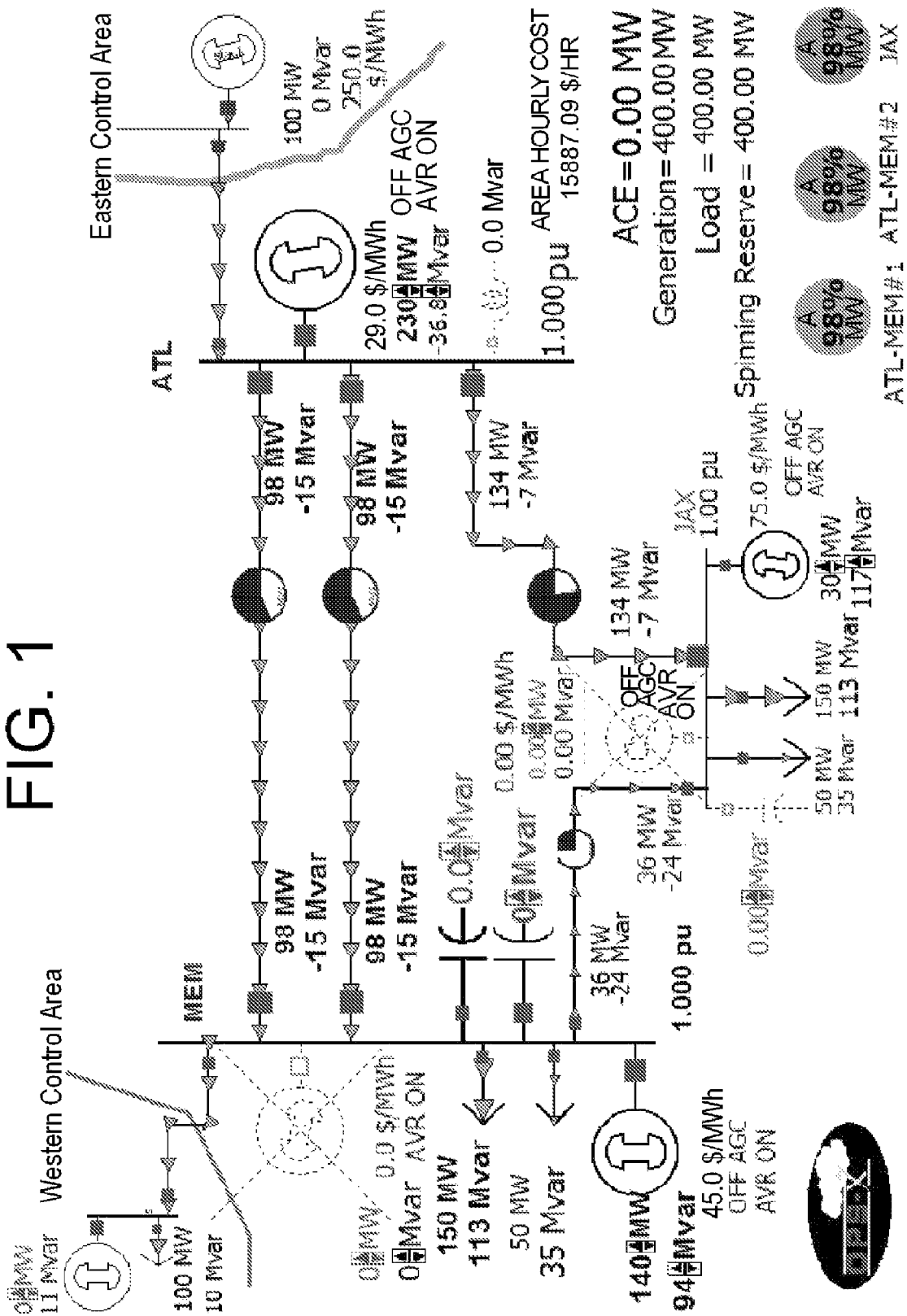
FIG. 1 is a schematic illustration of a power system configuration in one of the training modules in the time driven, computer simulation based electric power system training software package according to the present invention.
Figure 2:
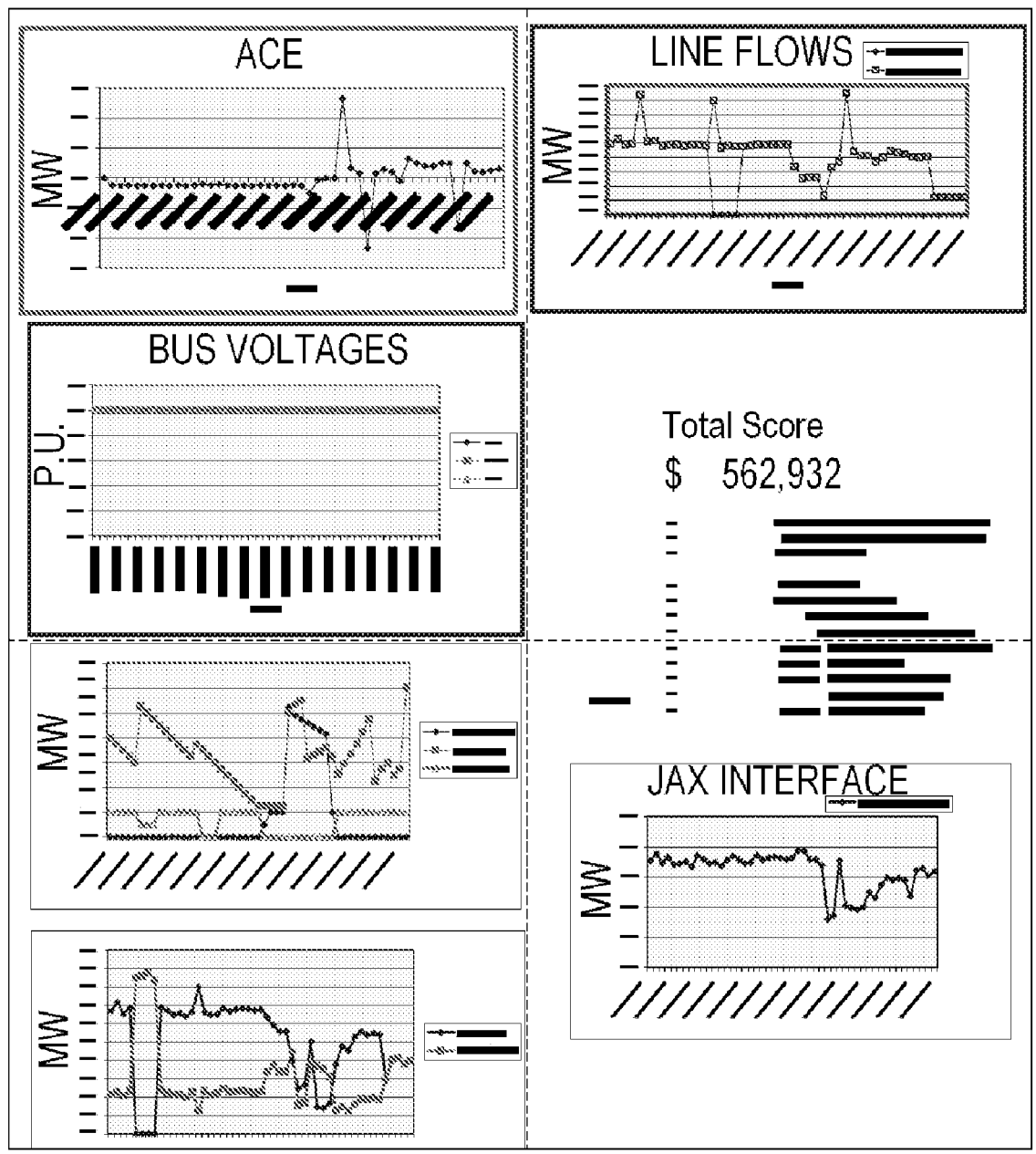
FIG. 2 is a schematic representative illustration of results which are presented to the operator in graphical and numeric form in the time driven, computer simulation based electric power system training software package according to the present invention.
Figure 3:
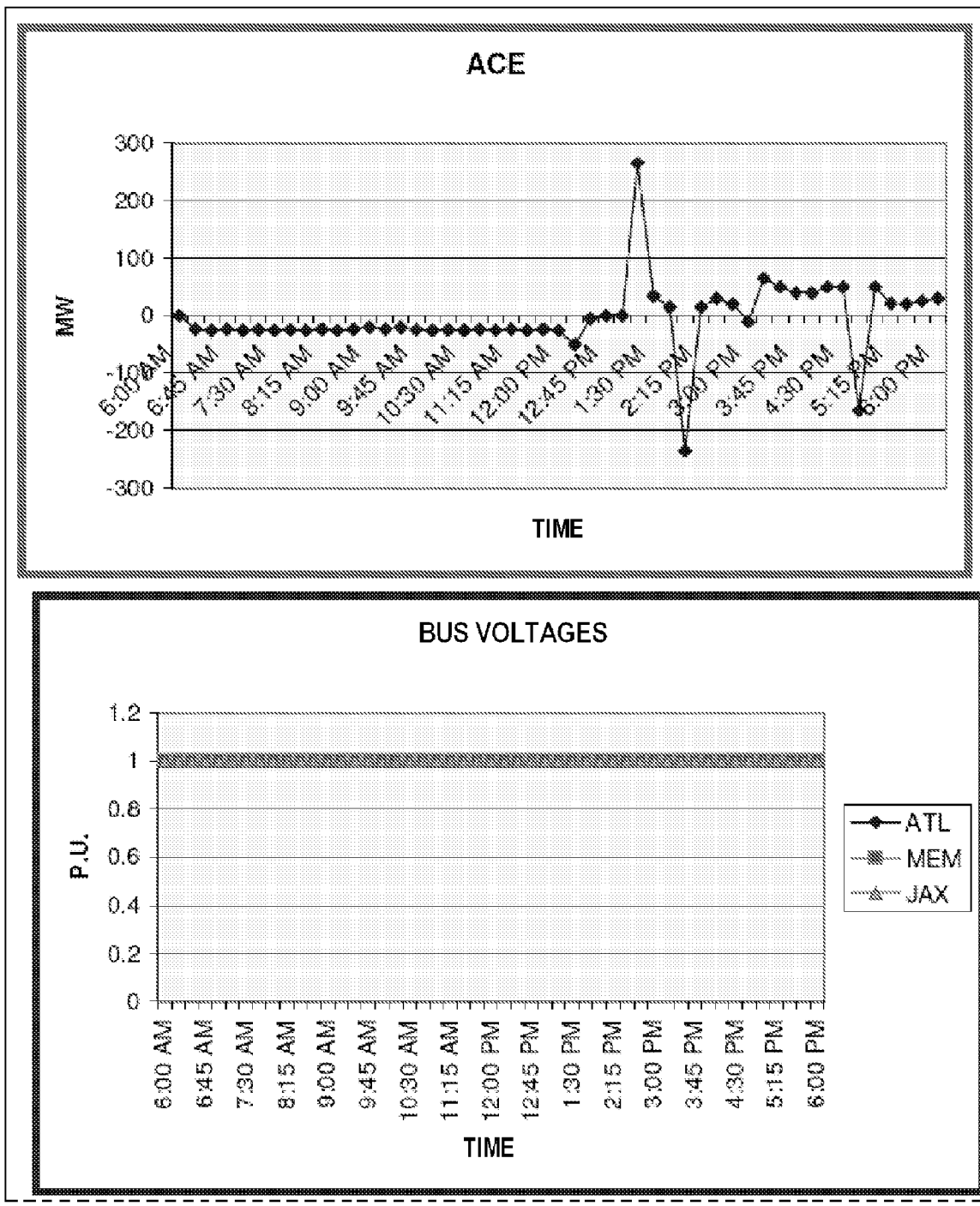
FIGS. 3-6 are enlarged schematic representative illustrations of portions of the results shown in FIG. 2.
Figure 4:
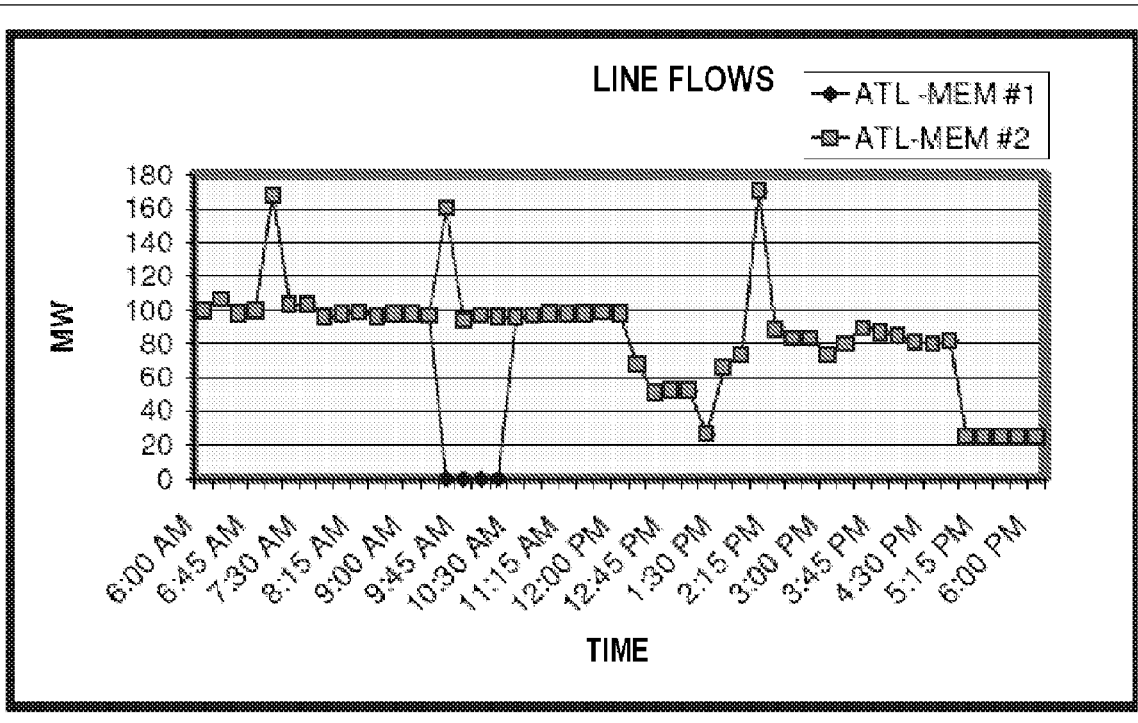
Figure 5:
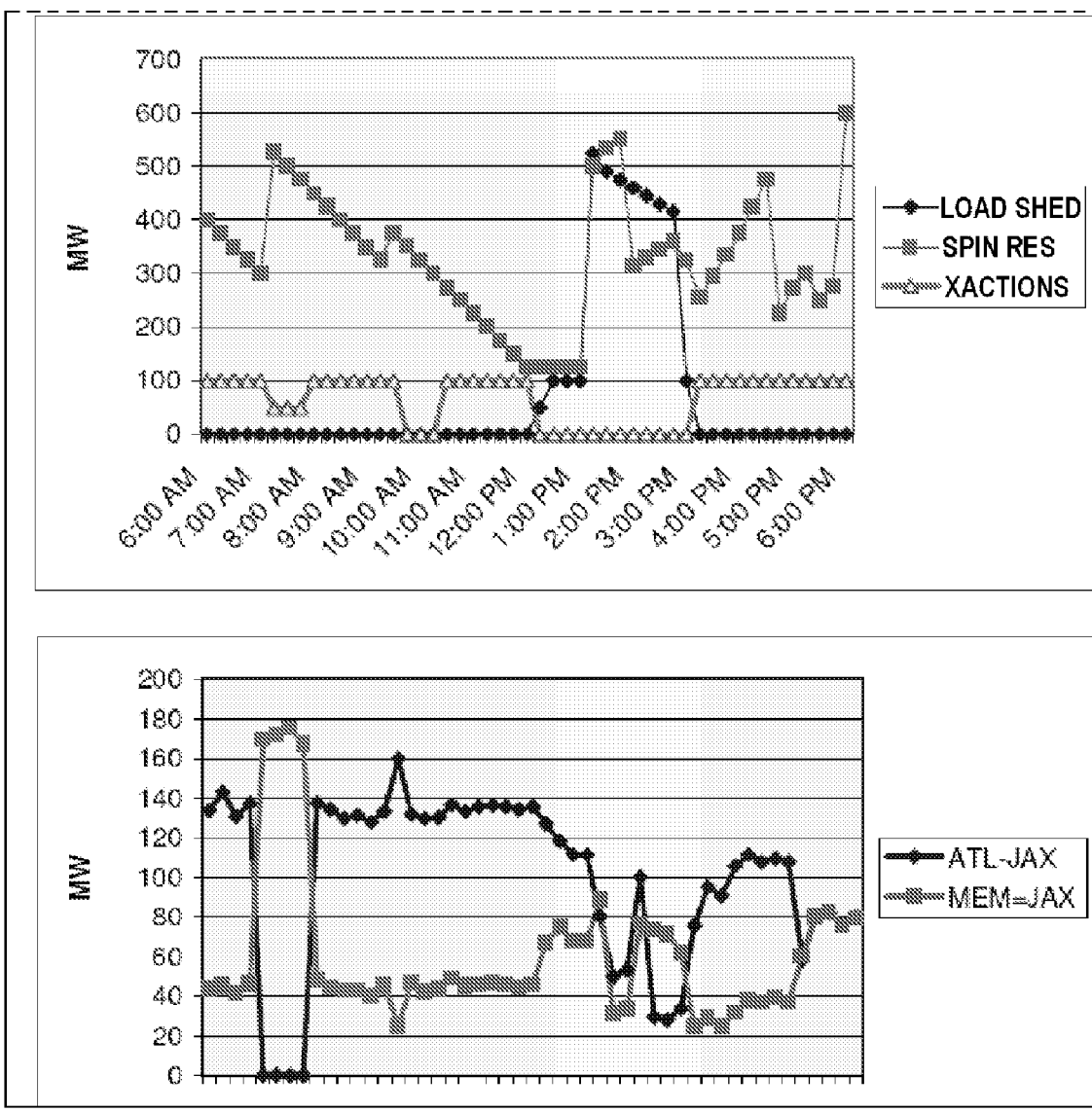
Figure 6:
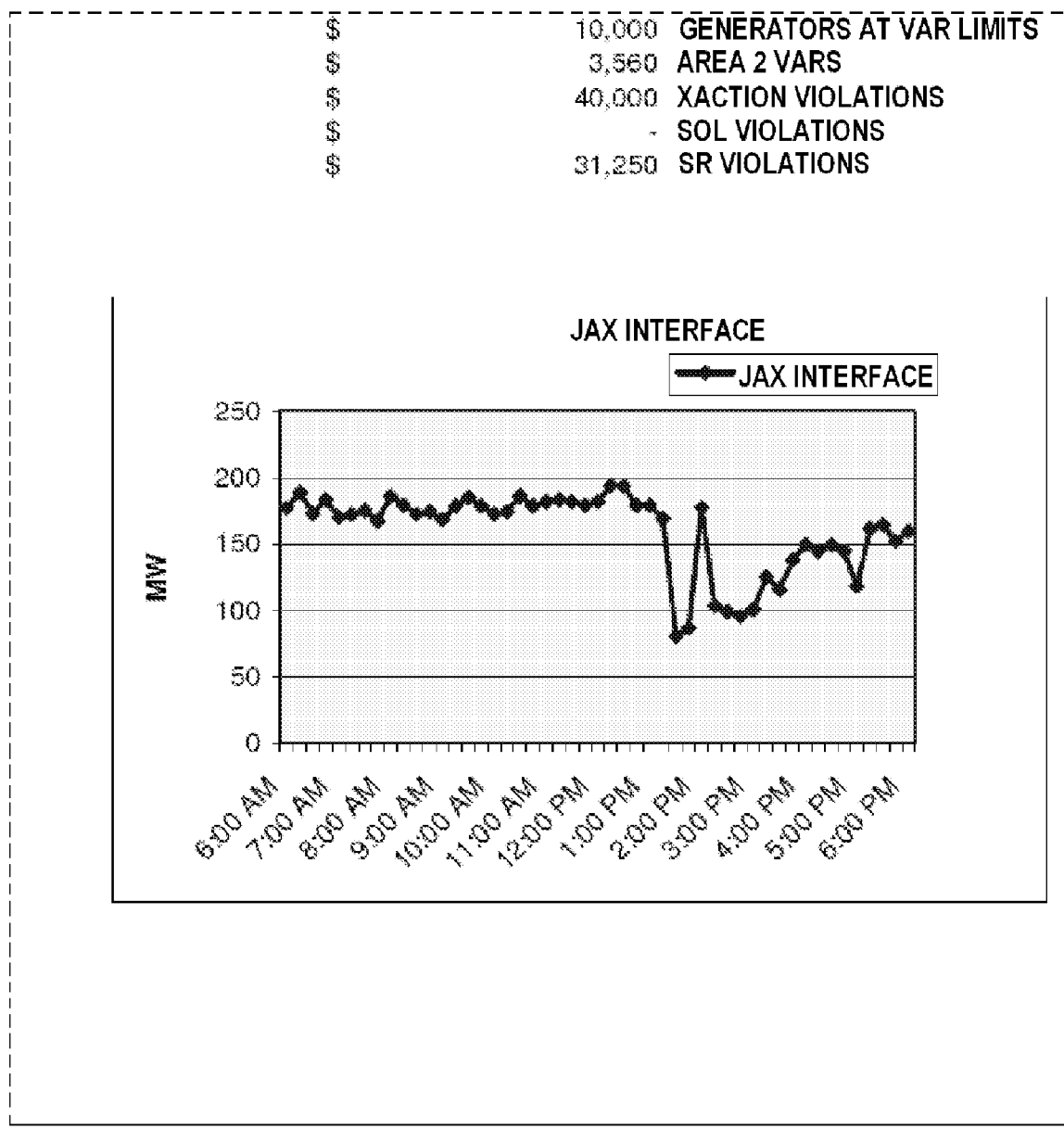

FIG. 1 below shows the power system configuration in one of the training modules in the time driven, computer simulation based electric power system training software package according to the present invention. This configuration was designed specifically to teach certain fundamental principles of power system operations to the student. Voltages at each of the buses, as well as line flows on each line, generation output at each generator, generation costs, SOL violations, spinning reserve violations, transactions, load shed and load and generation balance are monitored as the exercise proceeds and stored for each point in time in the simulation. The results are presented to the operator in graphical and numeric form as shown in FIGS. 2-6. The software package of the present invention consists of four computer files: 1) a binary file that provides all the data to be plugged into the electric power system modeling algorithms, 2) a graphics file that shows a picture of the power system and serves as a graphical man-machine interface with the electric power system modeling algorithms, 3) a time dimension file that initiates and ends the simulation session and that changes specific data in the data file as time progresses and stores a history of selected parameters over the course of the simulation session; and 4) an Excel spreadsheet file that performs calculations on data and presents data in graphical form based on output from the electric power system modeling algorithms at the end of the simulation time.

In short, time driven power simulators are to the power industry as fighter pilot simulators are to the military. They drastically increase the students' ability to perform their jobs and improve their critical decision making capability in a time driven environment.

Numeric scoring of simulations will allow more students to take more simulator based training as it opens the door to self study with decreased need for instructor participation. The numeric feedback and scoring techniques are utilized in the time driven, computer simulation based electric power system training software package according to the present invention and this will improve the quality of simulator training and as a result will improve the proficiency of power system operators around the world. Improved system operator proficiency will lead to increased system reliability, better utilization of the electric system infrastructure (need to build fewer generation stations and transmission lines), reduced fuel costs and a lower the consumption of fossil fuels. Improved system reliability will result in fewer blackouts thus mitigating the loss of productivity and the regrettable loss of life that at times accompanies such blackouts.

The training techniques presented in the time driven, computer simulation based electric power system training software package according to the present invention are unique and important to America's (and any country's) energy future, defense and economy. Improved system operation and increased reliability will save the American economy billions of dollars each year. The nature of America's power system infrastructure is that it becomes increasing complex as the population, economy and sophistication of electric load increases. The operation of that system also increases in complexity. Operators must be trained to operate the increasingly complex and evolving system. Many of today's techniques and methods will not be adequate or appropriate tomorrow. Sophisticated training of this nature made possible by the methods and techniques of the time driven, computer simulation based electric power system training software package as described here are critical to the America's energy future.

The time driven, computer simulation based electric power system training software package according to the present invention has a number of additional features that make it a true training simulation tool rather than an awkward extension of a mathematical model developed for a different purpose. With the invention, the power system student operators are faced with a time driven simulation scenario that continually changes with time in response to preprogrammed commands. The simulation training package provides the unique capability to present the student with specific learning objectives in an ever changing simulation case with a time dimension and eliminates the need for instructor interaction or immediate student supervision.

As the simulation proceeds with time, system parameters change as pre-programmed in the scenario design and as a result of student operator interaction. These system parameters are output to a binary file so that one has a history of the simulation which represents how conditions changed and what actions the operator took in response to those changes and when such action was taken.

The time driven, computer simulation based electric power system training software package according to the present invention is unique in that for the first time critical system parameters are portrayed graphically after the fact allowing for trainers to analyze those actions taken by students so as to assign a numerical grade to a simulation training exercise and determine whether the student sufficiently understood the principles of the training exercise so as to be judged to have achieved the training objective.

The methodology of the invention involves identifying a satisfactory target performance range for each key system parameter at each point in time. The after the fact data (results) from the simulation are then compared to the base line performance target data in an Excel spreadsheet, although any appropriate available spreadsheet could be used. Calculations are then performed to assess quantitatively how well the results match the target and a numeric score is derived. The results are also displayed graphically so that the student can see his results and get visual feedback as to how well he performed against various standards and see at what points in time performance standards may have been violated.

The key parameters of a simulation exercise can vary from exercise to exercise but generation production costs, line loadings, system load and voltage profiles are monitored versus time in all exercises. The timing of operator action is derived from these parameters. In exercises pertaining to electric system restoration, the sequence and timing of operator actions is also monitored and scored directly.

In each exercise, the objective is for the operator to minimize total system costs. One objective is to minimize generation production costs. Another objective is to maintain transmission lines at or below rating. When lines are subjected to operation at above rating, the life of the equipment is shortened. A dollar value for this cost is assigned when operation is above rating. Similarly, when equipment is operated outside of its voltage range, life expectancy can be shortened. Again a dollar value for this cost is assigned. When an operator does not serve load for any reason, this represents lost income to the company and a cost of lost service for the customer. Again a dollar value for this cost is assigned. Similar costs are assigned to all other key parameters that are measured in the simulation. These costs are carefully balanced relative to each other to ensure that the student operator is economically motivated to take the proper action in each of the system simulations based upon economic and reliability considerations within the learning objectives.

The simulation modules of the present invention are the first to quantify and numerically balance the multitude of system parameters to provide feedback to and evaluate a student operator based upon specific learning objectives and industry standards.

The need for feedback and numeric scoring is driven by industry training delivery techniques and training standards. The North American Electric Reliability Council recently released new guidelines for electric power system operator training. These guidelines require that system operators receive between 140 and 200 hours of training over a three year period to retain their certification for one of four levels of power system operation. The guidelines require that 30 hours of that training be simulator based training. A separate guideline requires that operators have 40 hours of Emergency Operation training each year. OPS-X meets the criteria to satisfy each of these requirements.

NERC has further tightened its criteria for training programs requiring that all training must have methods in place to evaluate the extent to which the student achieved the learning objectives of training. While there exists subjective methods to evaluate a student's performance in a simulation exercise with immediate instructor supervision, the numeric grading method of the invention allows students to take training via simulation exercises in a self study mode and obtain a quantified evaluation score that would indicate the extent to which objectives have been achieved. The numeric scoring also increases standardized scoring across all students taking a specific simulation exercise and provides better feedback to the student as to his understanding of industry economic and reliability standards.

Whereas particular embodiments of this invention have been described above for purposes of illustration and in the attached summary sheet, it will be evident to those skilled in the art that numerous variations of the details of the present invention may be made without departing from the invention.

What is claimed is:

1. A Process for Electric Power System Training using an existing set of electric power system modeling algorithms comprising:

Providing the electric power system operational data to be plugged into the electric power system modeling algorithms;

Providing a graphical man-machine interface with the electric power system modeling algorithms;

Initiating and ending a simulation session over a given time set for the session wherein the trainee objective is for an operator to minimize simulated total system costs for each session;

continually changing specific parameters in the stimulation scenario as time progresses within the simulation session in response to preprogrammed commaned and operater interaction;

storing a history of selected parameters over the course of the simulation session;

identifying a satisfying target performance range for each selected parameter at each point in time throughout the session defining a baseline performance target data for each selected parameter;

presenting session data in graphical form based on output from the electric power system modeling algorithms at the end of the simulation time; and providing numberical feedback to the operator by calculating a numberical grading of the session based upon a comparison of the actual simulation performance data for each selected parameter and the baseline performance target data at each point in time throughout the session.

2. The Process for Electric Power System Training using an existing set of electric power system modeling algorithms according to claim 1 wherein costs are assigned to all simulated parameters that are measured in the simulation and wherein generation production costs, line loadings, system load and voltage profiles are monitored versus time throughout the session in all sessions.

3. The Process for Electric Power System Training using an existing set of electric power system modeling algorithms according to claim 1 wherein costs are assigned to all simulated parameters that are measured in the simulation and wherein when lines are subjected to operation at above rating in a simulation a dollar value for this cost is assigned addressing increased capital costs in the simulated system, and wherein when equipment is operated outside of its voltage range in a simulation a dollar value for this cost is assigned addressing increased capital costs in the simulated system, and wherein when an operator does not serve load for any reason in a simulation a dollar value for this cost is assigned for lost income to the simulated system.

4. The Process for Electric Power System Training using an existing set of electric power system modeling algorithms according to claim 3 further including storing a history of selected parameters over the course of the simulation session; wherein the selected parameters include at least generation production costs, line loadings, system load and voltage profiles.

5. The Process for Electric Power System Training using an existing set of electric power system modeling algorithms according to claim 1 wherein costs are assigned to all other key parameters that are measured in the simulation.

6. The Process for Electric Power System Training using an existing set of electric power system modeling algorithms according to claim 5 further including storing a history of selected parameters over the course of the simulation session; wherein the selected parameters include at least generation production costs, line loadings, system load and voltage profiles.

7. The Process for Electric Power System Training using an existing set of electric power system modeling algorithms according to claim 5 wherein the trainee objective is for the operator to minimize simulated total system costs for each session simulation, and wherein when lines are subjected to operation at above rating in a simulation a dollar value for this cost is assigned addressing increased capital costs in the simulated system, and wherein when equipment is operated outside of its voltage range in a simulation a dollar value for this cost is assigned addressing increased capital costs in the simulated system, and wherein when an operator does not serve load for any reason in a simulation a dollar value for this cost is assigned for lost income to the simulated system.

8. A Process for Electric Power System Training using an existing set of electric power system modeling algorithms comprising:

Providing the electric power system operational data to be plugged into the electric power system modeling algorithms;

Providing a graphical man-machine interface with the electric power system modeling algorithms;

Initiating and ending a simulation session over a given time set for the session;

continually changing specific parameters in the simulation scenario as time progresses within the simulation session in response to preprogrammed commands and operator interaction;

storing a history of selected parameters over the course of the simulation session; and presenting session data in graphical form based on output from the electric power system modeling algorithms at the end of the simulation time;

identifying a satisfactory target performance range for each selected system parameter at each point in time during the session defining a baseline performance target data for each selected parameter; and providing numerical feedback to an operator by calculating a numerical grading of the session based upon a comparison of the actual simulation performance data for each selected parameter and the baseline performance target data at each point in time throughout the session.

9. A Process for Electric Power System Training using an existing set of electric power system modeling algorithms comprising:

Providing the electric power system operational data to be plugged into the electric power system modeling algorithms;

Providing a graphical man-machine interface with the electric power system modeling algorithms;

Initiating and ending a simulation session over a given time set for the session;

continually changing specific parameters in the simulation scenario as time progresses within the simulation session in response to preprogrammed commands and operator interaction;

storing a history of selected parameters over the course of the simulation session; wherein the selected parameters include at least generation production costs, line loadings, system load and voltage profiles;

identifying a satisfactory target performance range for each selected system parameter at each point in time during the session defining a baseline performance target data for each selected parameter; and providing numerical feedback to an operator by calculating a numerical grading of the session based upon a comparison of the actual simulation performance data for each selected parameter and the baseline performance target data at each point in time throughout the session.

10. The Process for Electric Power System Training using an existing set of electric power system modeling algorithms according to claim 9 wherein the trainee objective is for the operator to minimize simulated total system costs for each session, and wherein when lines are subjected to operation at above rating in a simulation a dollar value for this cost is assigned addressing increased capital costs in the simulated system, and wherein when equipment is operated outside of its voltage range in a simulation a dollar value for this cost is assigned addressing increased capital costs in the simulated system, and wherein when an operator does not serve load for any reason in a simulation a dollar value for this cost is assigned for lost income to the simulated system.

11. The Process for Electric Power System Training using an existing set of electric power system modeling algorithms according to claim 9 wherein costs are assigned to all simulated parameters that are measured in the simulation.

12. The Process for Electric Power System Training using an existing set of electric power system modeling algorithms according to claim 9 further comprising the step of presenting session data in graphical form based on output from the electric power system modeling algorithms at the end of the simulation time.

13. The Process for Electric Power System Training using an existing set of electric power system modeling algorithms according to claim 12 wherein the trainee objective is for the operator to minimize simulated total system costs for each session.

\* \* \* \* \*